United States Patent Office 3,704,335
Patented Nov. 28, 1972

3,704,335
METHOD FOR PROMOTING THE GROWTH OF LIVESTOCK
Yutaka Kodama and Akira Takai, Toyama-shi, and Tatsumi Inagaki, Tokyo, Japan, assignors to Toyama Chemical Co., Ltd., Tokyo, Japan
No Drawing. Filed July 25, 1969, Ser. No. 845,053
Int. Cl. A61k 27/00
U.S. Cl. 424—249               4 Claims

ABSTRACT OF THE DISCLOSURE 3-di(hydroxymethyl)amino - 6-(5-nitro - 2-furylethenyl)-1,2,4-triazine is very effective for promoting the growth of livestock (for example, poultry, ducks, turkeys, swine, horses, cattle and goats) when given to the livestock in combination with carriers such as feeds and inert minerals.

---

The present invention relates to a growth-promoting composition for livestock, and more particularly to the composition comprising as an effective ingredient 3-di(hydroxymethyl)amino-6-(5 - nitro-2 - furylethenyl)-1,2,4-triazine.

It has been known that a certain nitrofuran derivative such as 3-(5-nitro-2-furfurylideneamino)-oxazolidin-2-one or 5-nitro-2-furyl acrylic acid amide or 5-nitro-2-furfural semicarbazone promotes the growth of livestock, for example, poultry, ducks, turkeys, swine, horses, cattle and goats at the growing stage.

The object of the present invention is to provide a new nitrofuran-type growth-promoting composition for livestock.

According to the invention, there is provided a growth-promoting composition for livestock, which comprises an inert carrier and 3-di(hydroxymethyl)amino-6-(5-nitro-2-furylethenyl)-1,2,4-triazine of the formula

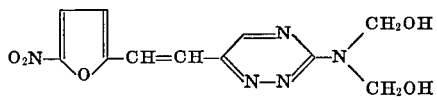

3-di(hydroxymethyl)amino - 6-(5-nitro-2-furylethenyl)-1,2,4-triazine (abbreviated hereinafter as PF-S) is a tastless, odorless, yellow crystalline powder and may be prepared by the method described in Chemical Abstracts 63, 16370C (1965). The composition of the present invention comprises an effective amount of PF-S as an effective ingredient and a carrier or diluent such as common feeds, minerals, wheat flour, soybean fluor and corn fluor which are inert to PF-S.

The growth of livestock can be promoted or an increase in the body-weight thereof can be achieved when the composition is given repeatedly to the livestock at the growing stage. The dose of PF-S varies according to the kind of growing stage of the livestock. In general, PF-S is given to the livestock in the form of a mixture of a feed containing 0.0002 to 0.005 percent by weight of PF-S. For example, such a very small dose of PF-S as 0.0002 to 0.001 percent by weight based on the feedstuff promotes the growth of chicks, and an increase of weight of the male chicks for broilers. This is a remarkable feature of the present invention.

The growth-promoting effect on rats is shown in the following Table I as a fundamental test.

TABLE I

| | Average body-weight of rat before administration (g.) | Increase of average body-weight (percent) after administration | | | | Average body-weight after test (g.) |
|---|---|---|---|---|---|---|
| | | 1 week | 2 weeks | 3 weeks | 4 weeks | |
| Contrast group [1] | 160 | 11 | 18 | 23 | 40 | 225 |
| PF-S group [2] | 155 | 17 | 29 | 44 | 63 | 255 |

[1] 20 rats are used in each contrast and PF-S group.
[2] PF-S is added only the feed in an amount of 0.0005 percent by weight.

As clearly shown in the above table, PF-S can be appreciatively effective for increasing of the body-weight of livestock.

The following examples illustrate the growth-promoting effects of the composition of the present invention.

EXAMPLE 1

A breeding test was carried out using 40 male White Leghorn chicks in each test group. There were four test groups, that is, a contrast, PF-S 2 mg. per 1 kg. of feed, PF-S 5 mg. per 1 kg. of feed and PF-S 10 mg. per 1 kg. of feed, respectively. The chicks in each group were further divided into smaller groups of 10 chicks each and bred according to the battery method for 9 weeks. The results are shown by body-weight of each 20 chicks in Table II.

TABLE II

| Group | Before administration | Body-weight of 20 chicks after administration | | | | | Average increase of weight (times) | Average increase of weight as compared with contrast (percent) |
|---|---|---|---|---|---|---|---|---|
| | | 1 week (g.) | 3 weeks (g.) | 5 weeks (g.) | 7 weeks (g.) | 9 weeks (g.) | | |
| Contrast | 735 | 1,211 | 4,499 | 9,136 | 13,005 | 17,571 | 23.9 | 100 |
| PF-S: | | | | | | | | |
| 2 mg./kg. | 730 | 1,323 | 4,901 | 9,720 | 14,012 | 18,400 | 25.2 | 105 |
| 5 mg./kg. | 742 | 1,426 | 5,400 | 10,331 | 14,805 | 19,822 | 26.7 | 112 |
| 10 mg./kg. | 760 | 1,411 | 5,282 | 9,971 | 14,900 | 19,700 | 26.0 | 109 |

From the above results, it was appreciated that a body-weight increase of 5 to 12% based on the contrast was obtained after 9 weeks by giving a feed containing PF-S in the indicated amounts. When the body-weight increase in each small group was inspected during 3 to 5 weeks breeding, some groups showed more than 20 percent increase as compared with the contrast small group, and the other small groups also showed, in general, superior results as compared with the increase ratio after 9 weeks. This demonstrates that PF-S is more effective in the initial breeding of chicks rather than in the later course of breeding where weight increase ratio decreases and approximates to that of the contrast.

The anatomic inspection of chicks after the breeding showed no differences in the meat quality between the contrast and PF-S groups.

EXAMPLE 2

Six two-month-old uterine Yorkshire pigs having a body-weight of 9.8 to 14.3 kg. individually were divided into a contrast group involving 3 pigs and a PF-S group involving 3 pigs. The pigs were bred for 60 days by allowing them to feed at will on a powdered which contained in the PF-S group the compound in an amount of 5 mg. per 1 kg. thereof.

The results are shown in the following Table III.

TABLE III

|  | Period (day) | Average body-weight before breeding [A] (kg.) | Final average body-weight (kg.) | Increase [B] (kg.) | Ratio of increase [B]/[A] (percent) | Index of increase |
| --- | --- | --- | --- | --- | --- | --- |
| PF-S group, 5 mg./kg. (3 pigs) | 60 | 11.249 | 25.577 | 14.328 | 1.27 | 128 |
| Contrast group (3 pigs) | 60 | 12.178 | 24.200 | 12.022 | 0.99 | 100 |

From the above table, it will be appreciated that pigs given PF-S show a remarkable weight improvement as compared with those of the contrast group.

No detrimental side effects of the compound or unwillingness of the pigs to take the feed was seen in the PF-S group. In addition, there were no contracted pigs in the PF-S group, while occurrence of loose-passage and scours was seen in two pigs belonging to the contrast group, respectively.

What is claimed is:

1. The method of promoting the growth of livestock selected from the group consisting of swine and poultry at the growing stage which comprises feeding said livestock a composition comprising an inert carrier and a growth-promoting effective amount of 3-di(hydroxymethyl)amino-6-(5-nitro-2-furyl-ethenyl)-1,2,4-triazine.

2. The method of claim 1, wherein the composition comprises 3-di(hydroxymethyl)amino-6-(5-nitro-2-furyl-ethenyl)-1,2,4-triazine in an amount of from 0.0002 to 0.005 percent by weight based on the total weight of the composition.

3. The method of claim 1, wherein the composition comprises 3-di(hydroxymethyl)amino-6-(5-nitro-2-furyl-ethenyl)-1,2,4-triazine in an amount of from 0.0002 to 0.001 percent by weight based on the total weight of the composition and the livestock are poultry.

4. The method of claim 1, wherein the composition comprises 3-di(hydroxymethyl)amino-6-(5-nitro-2-furyl-ethenyl)-1,2,4-triazine in an amount of 0.0005 percent by weight based on the total weight of the composition and the livestock are swine.

References Cited

UNITED STATES PATENTS

| 3,151,110 | 9/1964 | Kodama et al. | 260—249.5 |
| 3,153,648 | 10/1964 | Kodama et al. | 260—249.5 |

FOREIGN PATENTS

| 13,790 | 1954 | Japan | 424—249 |

OTHER REFERENCES

Japanese Patent Abstracts, 21528/64.
Chemical Abstracts 63, 16370c (1965).

ALBERT T. MEYERS, Primary Examiner
F. E. WADDELL, Assistant Examiner